(12) United States Patent
Rotole (10) Patent No.: US 6,782,807 B2
(45) Date of Patent: Aug. 31, 2004

(54) KNOT-RELIEVING TWINE TENSIONER FOR BALER

(75) Inventor: David Vincent Rotole, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/345,471

(22) Filed: Jan. 15, 2003

(65) Prior Publication Data

US 2004/0134360 A1 Jul. 15, 2004

(51) Int. Cl.⁷ .............................................. B65B 13/22
(52) U.S. Cl. ......................................... 100/29; 100/32
(58) Field of Search ............................ 100/26, 29, 32; 53/589, 592, 399; 140/93.2, 93.4, 93 F, 93 R (56) References Cited

U.S. PATENT DOCUMENTS

| | | | | |
|---|---|---|---|---|
| 3,526,187 A | * | 9/1970 | Gilliard ........................ 100/2 |
| 4,196,661 A | * | 4/1980 | Yatcilla et al. ................. 100/4 |
| 4,516,488 A | * | 5/1985 | Bartzick et al. ............... 100/4 |
| 5,377,477 A | * | 1/1995 | Haberstroh et al. ........... 53/399 |
| 5,459,977 A | * | 10/1995 | Haberstroh .................. 53/399 |
| 5,988,053 A | | 11/1999 | Leupe et al. ................... 100/3 |
| 6,041,698 A | * | 3/2000 | Chin-Chang et al. ......... 100/26 |
| 6,568,158 B2 | * | 5/2003 | Shibazaki et al. ............ 53/582 |

* cited by examiner

Primary Examiner—Allen Ostrager
Assistant Examiner—Jimmy Nguyen (57) ABSTRACT

A twine tensioner includes upper and lower ribbed rollers biased together so as to enlarge a length of twine passing between them so as to cause a predetermined tension to be required for advancing the length of twine through the rollers. The upper roller is mounted for movement relative to the lower roller and is guided such that, as it moves away from the lower roller, the twine tension first increases and then does not undergo any appreciable increase or spike as a knot in the length of twine through the nip of the rollers. The tensioner is constructed such that the upper roller may be easily manually moved away from the lower roller so as to permit twine to be threaded through the tensioner without requiring any additional tool.

10 Claims, 6 Drawing Sheets

KNOT-RELIEVING TWINE TENSIONER FOR BALER

FIELD OF THE INVENTION

The present invention relates to baler twine tensioners, and more specifically relates to a tensioner having the ability to operate satisfactorily when a knot securing ends of the supply rolls of twine passes through the tensioner.

BACKGROUND OF THE INVENTION

Balers using twine for wrapping the bales produced by them are normally provided with several supply rolls of twine, with a twine end of one roll being secured to a twine end of another roll by tying the ends together with a knot. The twine routing path normally includes one or more tensioners which aid in the control of the twine as it is pulled from the supply rolls. When the knot travels through current twine tensioners, the knot creates a restriction in the tensioner creating a very high twine tension. Typical twine tensioners do not allow the knot to pass through the system without a tremendous increase in the tension and this can result in possible damage, increased wear and/or twine breakage.

The tension of the twine passing through tensioners constructed according to the known designs, (see the tensioner disclosed in U.S. Pat. No. 5,988,053, for example), is directly proportional to the force of a spring or springs used to bias a pair of ribbed rollers together for engaging the twine running between the rollers. Thus, the force acting on the twine is directly related to the roller center distance. In other words, any increase in the roller center distance caused by the twine or a knot creates a direct proportional increase in the twine tension.

Furthermore, due to this increasing force, it is difficult to manually force the ribbed rollers apart in order to thread or route the twine through the tensioner. This procedure is performed by taking a screw driver, pliers or other tool to pry or forcibly spread the rollers apart.

SUMMARY OF THE INVENTION

According to the present invention there is provided an improved baler twine tensioner comprising ribbed rollers biased towards each other.

An object of the invention is to provide a twine tensioner including a pair of ribbed tensioning rolls which are biased together and mounted so as to be able to have a knot pass between them without dramatically increasing twine tension.

A more specific object of the invention is to provide a twine tensioner wherein the movement of one of the ribbed rollers relative to the other is guided by a guide surface which results in a constant run tension over a range of twine sizes, and which operates to permit the center distance of the rollers to increase without resulting in a directly proportional increase of the twine tension. This is accomplished by arranging the guide surface and spring in such relationship to each other that the guide surface causes the spring force to remain substantially constant over the majority of the range of movement normally experienced by the moveable roller. It is conceivable that one or both of the rollers could be mounted to eccentric shafts mounted within a guide surface for pivoting against a resilient force offered by an associated torsion spring, the eccentric shape of the shaft or shafts resulting in the roller or rollers being guided so as to maintain a substantially constant tension force in a length of twine passing through the nip of the rollers, even during the time that the rollers separate to permit a knot in the twine to pass between them.

Yet another object of the invention is to provide a tensioner having a design permitting the moveable ribbed roller to be manually separated from the fixed roller with low force and no tools so as to permit threading of the twine through the tensioner. This is accomplished by mounting a handle to inner roller control or slot plates having the moveable roller mounted between them with its axle projecting through guide slots in respective outer fixed mounting plates, the handle being used to overcome the force of the biasing spring and cause the axle of the moveable roller to move along the guide slots so as to cause a relatively large separation of the tensioner rollers for easy threading of twine between them.

These and other objects of the invention will become apparent from a reading of the ensuing description together with the appended drawings.

DESCRIPTION OF THE PREFERRED EMBODIMENT

Figure 1:
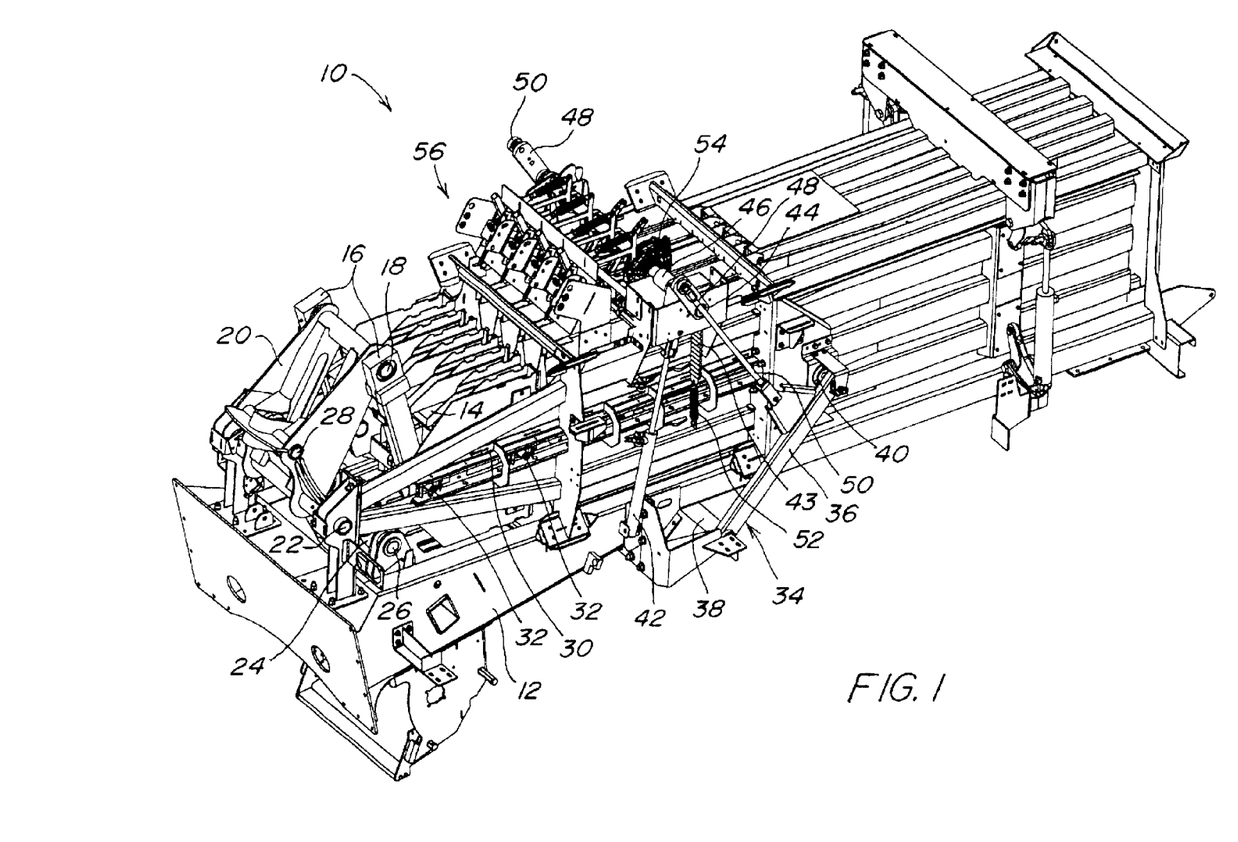
FIG. 1 is a left front perspective view showing a large rectangular baling chamber and some of the structure mounted thereto including the tensioner assembly of the present invention.

Referring now to FIG. 1, there is shown a baling chamber 10 of a large rectangular baler. The chamber 10 includes a framework 12 supporting a plunger 14 to which is coupled a drive linkage including a pair of connecting arms 16 having first ends pivotally coupled, as at coupling 18, to one end of a bifurcated crank arm 20 having a second end pivotally coupled to the framework 12 by a pin 22. An extensible and retractable, hydraulic cylinder 24 is provided for driving the plunger 14 and has a lower end anchored to the framework 12 by a structure including a connecting pin 26 and having an upper end coupled to the crank arm 20 by a pin 28. A guide structure 30 is provided at each side of the framework 12 and each of the opposite sides of the plunger 14 is provided with a pair of rollers 32 mounted for traveling along a respective guide structure 30.

A U-shaped, needle support yoke 34 includes a pair of opposite arms 36 (only one visible) joined to a cross tube 38 that extends transversely beneath the framework 12. Mounted at spaced locations along the cross tube 38 are a plurality of twine delivery needles (not shown). Respective ends of the arms 36, that are remote from the cross tube 38, are respectively pivotally coupled to the opposite sides of the framework 12 for swinging about oppositely projecting stub shafts 40. Motion of the needle support yoke 34 is caused by a knotter drive cylinder 42 having its rod end coupled to one end of a drive chain 43, which is engaged with the teeth of a knotter drive gear, not visible, that is coupled to a knotter drive shaft 44 by a one-way drive coupling 46, the shaft 44 carrying crank arms 48 at its opposite ends which are connected to the yoke arms 36 by motion transfer links 50. The opposite end of the drive chain 43 is coupled to a tension spring 52 that is anchored to the framework 12. A number of knotter gears 54, equal to the number of needles carried by the yoke 34 and of which only one is schematically indicated, are fixed to the knotter drive shaft 44. Rotation of the shaft 44 causes the knotter gears 54 to drive respective twine knotters (not shown) so as to secure loops of twine about a finished bale located within the chamber 10.

Provided in the path of twine being delivered to the needles is a twine tensioner assembly 56 (see also FIG. 2) including a transverse, upright support panel 58 fixed to the top of the framework 12 at a location in front of the knotter drive shaft 44. Opposite ends of the panel 58 are defined by forwardly projecting plates 60 which are each provided with three vertically spaced holes, with the two lower holes on each side carrying a twine guide 62 in the form of a ring, which may be made of a wear resistant, low friction plastic material, for example. Spaced equally across the front of the panel 58 are four identical twine tensioners 64.

Figure 2:
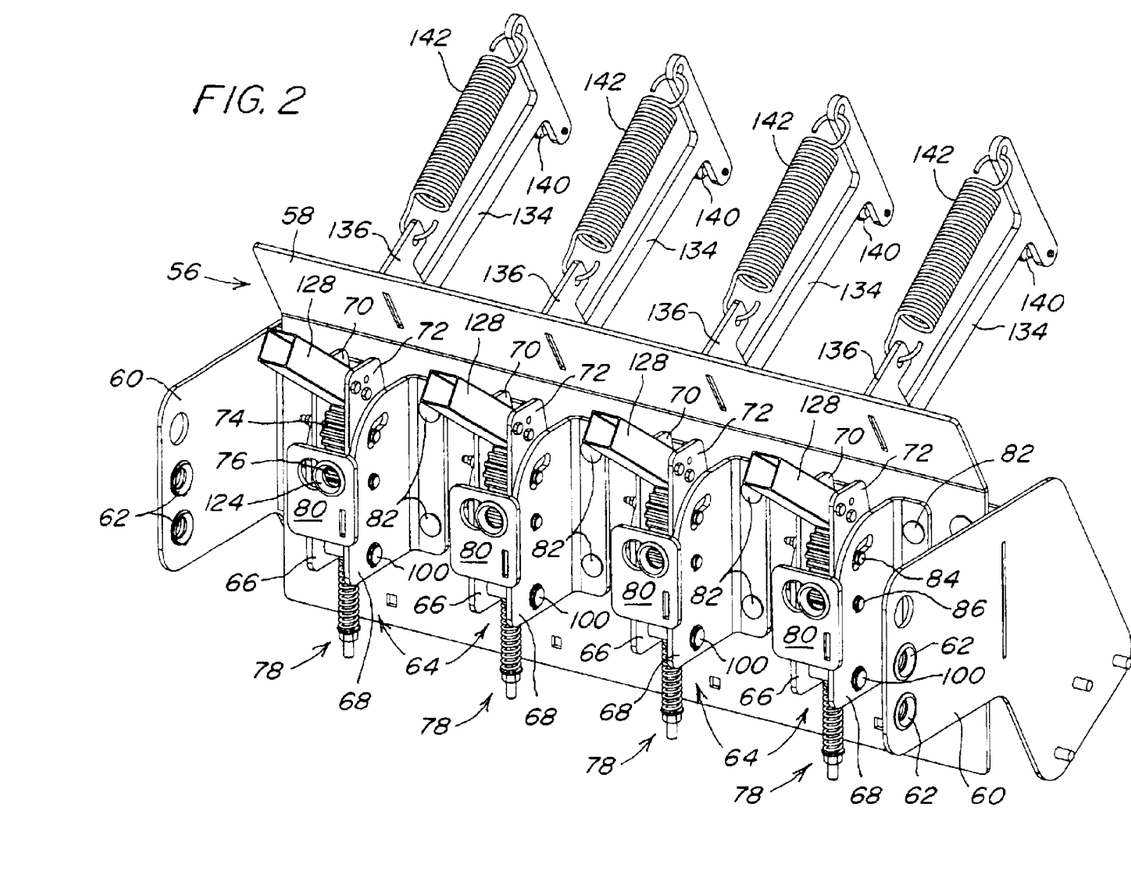
FIG. 2 is an enlarged left front perspective view of the tensioner assembly shown in FIG. 1.
Figure 3:
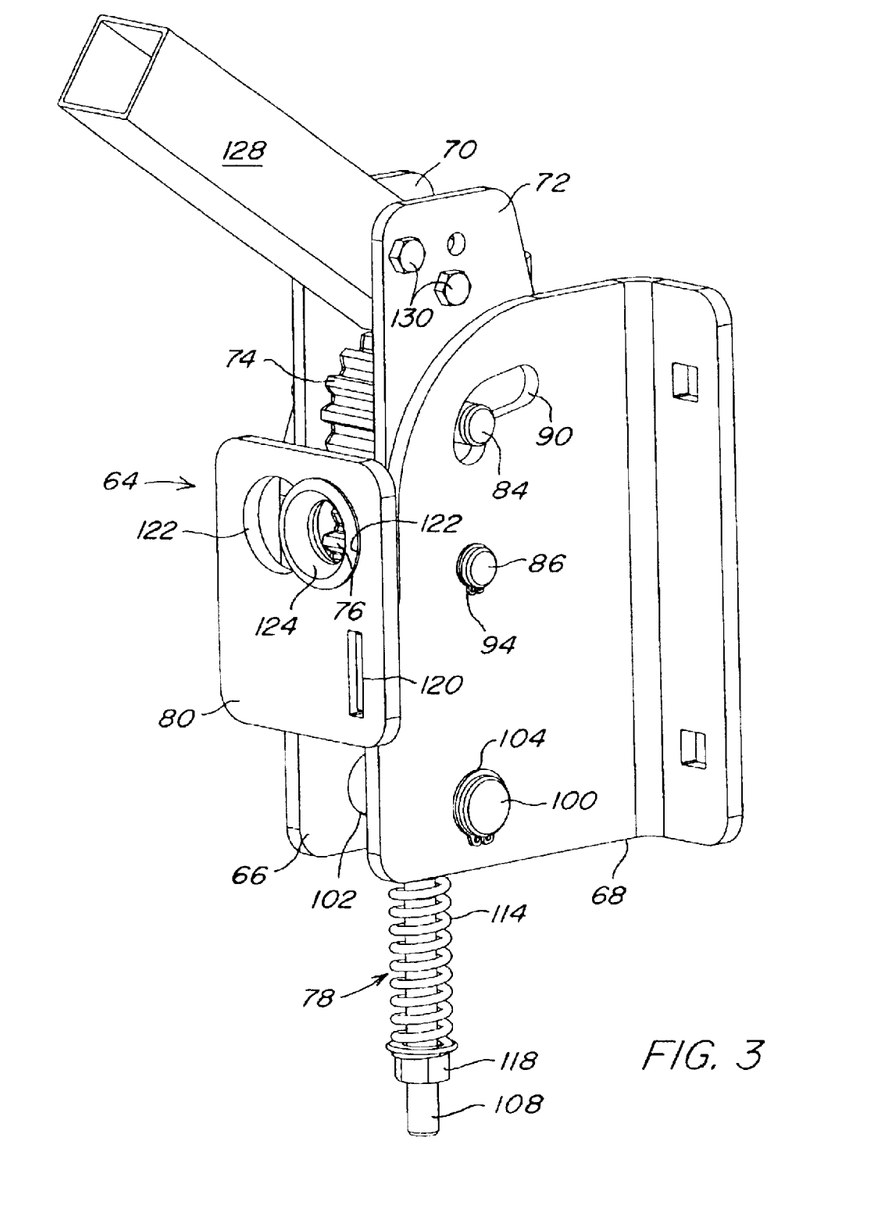
FIG. 3 is a left front, enlarged perspective view of one of the twine tensioners of the assembly shown in FIG. 2.

Each twine tensioner 64 includes right- and left-hand, transversely spaced, vertical mounting plates 66 and 68, respectively, a pair of identical, right and left roller control plates 70 and 72, identical upper and lower ribbed rollers or gears 74 and 76, a roller biasing spring assembly 78 and a twine guide mounting plate 80.

The mounting plates 66 and 68 are spaced transversely from each other and have respective parallel, planar, fore-and-aft extending portions that are joined to respective transverse mounting flanges which are secured to the panel 58 by vertically spaced bolts 82. The roller control plates 70 and 72 are respectively located against inner surfaces of the mounting plates 66 and 68. The upper and lower ribbed rollers or gears 74 and 76 are positioned between the control plates 70 and 72. The upper and lower ribbed rollers 74 and 76, respectively, are rotatably mounted on upper and lower roller shafts 84 and 86.

Figure 4:
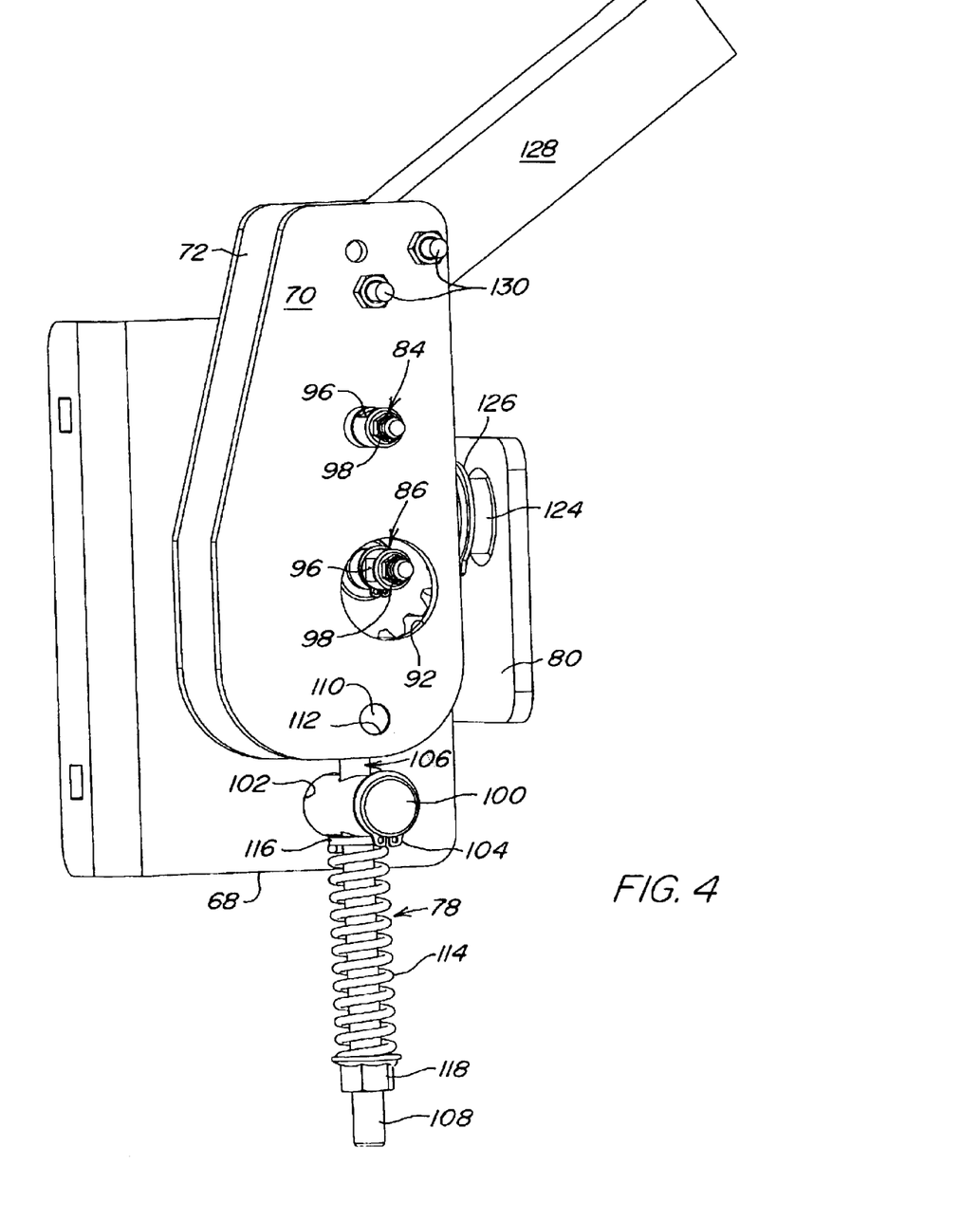
FIG. 4 is a right rear perspective view of the tensioner of FIG. 3, but with the left mounting plate removed.
Figure 5:
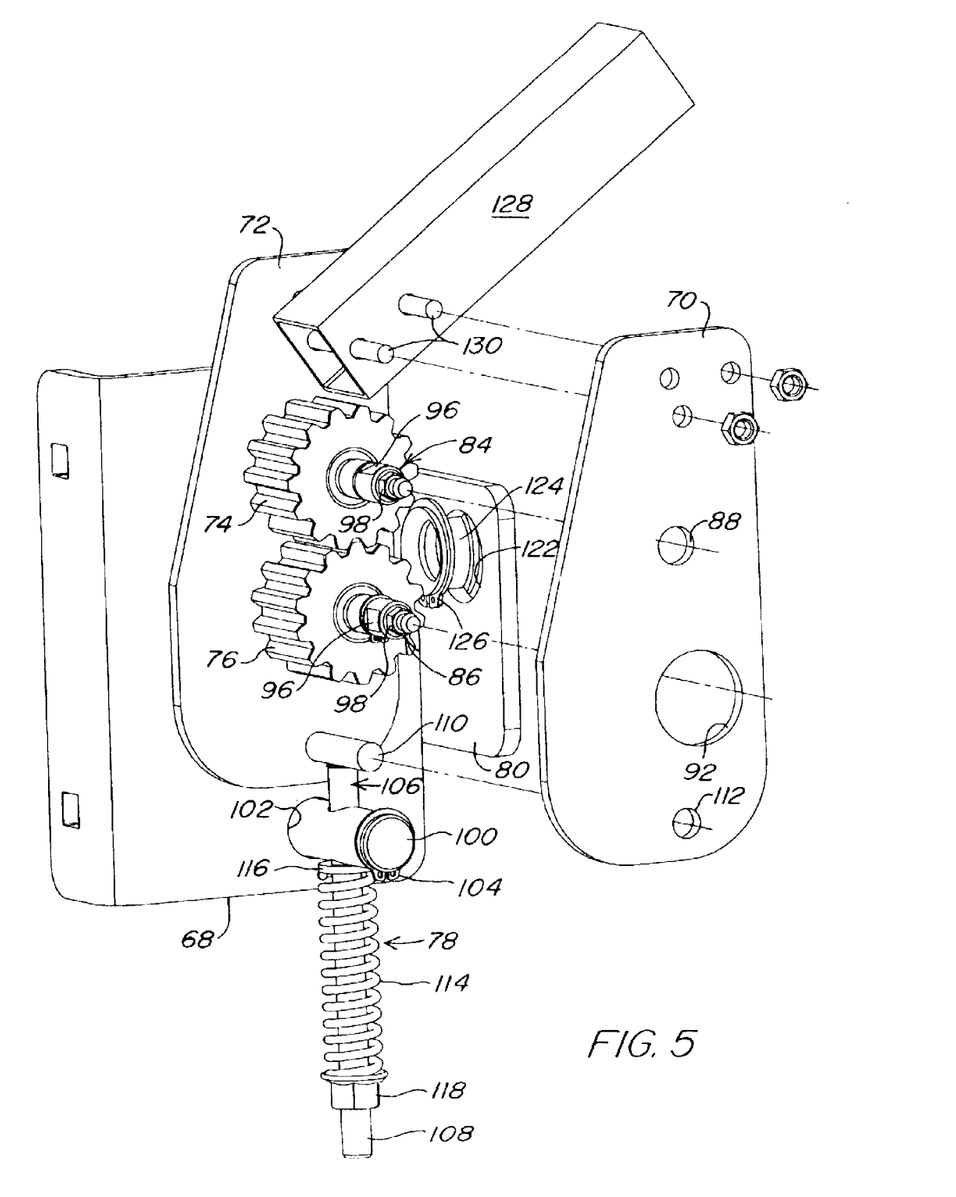
FIG. 5 is a view like that of FIG. 4, but being partially exploded.

Referring now also to FIGS. 3–5, it can be seen that right and left end sections of the upper roller shaft 84 are respectively received in circular holes 88 provided in the roller control plates 70 and 72, and are engaged with respective guide surfaces defined by guide slots 90 provided in the mounting plates 66 and 68. The guide slots 90 each include a short, substantially vertical forward end section joined to a substantially longer gradually upwardly and rearwardly inclined section. The lower roller shaft 86 has opposite end sections which respectively extend through clearance openings defined by large holes 92 provided in the control plates 70 and 72 at locations centered to the rear of, and below, the circular holes 88, with end sections of the lower roller shaft 86 being respectively received in circular holes (not shown) provided in the mounting plates 66 and 68. It is here noted that the clearance holes 92 could be shaped as guide slots for controlling the movement of the plates 70 and 72 relative to the lower roller shaft 86. Snap rings 94 are located in annular grooves provided in the opposite ends of the roller shaft 86 so as to hold the assembly together prior to mounting the plates 66 and 68 to the panel 58. Right-hand end sections of the shafts 84 and 86 are each provided with diametrically opposite flats 96 and a grease zerk.

The biasing spring assembly 78 is provided for resiliently resisting upward movement of the control plates 70 and 72, and, hence, upward movement of the upper ribbed roller 74 from an initial position spaced a minimum distance from the lower ribbed roller 76, wherein respective ribs of the rollers 74 and 76 are intermeshed, as is the case when no length of twine is disposed in the tensioner 64 between, and engaged by, the ribs of the rollers 74 and 76. For this purpose, the spring assembly 78 includes a transverse support shaft 100 having opposite end sections respectively pivotally received in circular holes 102 provided in the mounting plates 66 and 68 at respective locations below bottom edges of the control plates 70 and 72. The support shaft 100 is axially fixed by snap rings 104 provided in respective grooves at opposite end locations of the support shaft 100 adjacent outer surfaces of the mounting plates 66 and 68. A T-bolt 106 includes a stem 108, projecting downwardly through a cross bore provided in the mounting shaft 100, and a head 110 having opposite ends respectively located within circular holes 112 provided substantially vertically below the hole 88 in a lower area of each of the control plates 70 and 72. A compression coil spring 114 is received on the T-bolt stem 108 between a flat washer 116 disposed below the support shaft 100 and a flange nut 118 threaded onto a threaded lower end section of the stem 108 so as to establish a desired state of compression or pre-load in the spring 114.

The twine guide mounting plate 80 is rectangular or square and is disposed transversely across the front of the twine tensioner 64 with a slot being provided in a lower left corner region of the plate 80 and receiving a tab 120 that is welded within the slot. A pair of partial circular openings 122 that are joined at their inner sides are provided in an upper location of the plate 80, with a circular twine guide 124, having a smooth-walled, low friction interior surface, being mounted in one of the openings 122, the other opening being available for use with a baler for making different sized bales where a different number of twine loops are tied about a formed bale. The twine guide 124 includes a forward end that is too large to fit through the opening 122, and a snap ring 126 is received in a groove provided in the guide 124 at a location just to the rear of the mounting plate 80. The twine guide 124 is located so as to be just forward of the nip defined between the upper and lower ribbed rollers 74 and 76, respectively.

To aid in manually separating the rollers 74 and 76 so as to thread a length of twine between the rollers, a rear end section of an upwardly and forwardly inclined handle 128 is located between and secured to an upper forward location of the roller control plates 70 and 72, as by bolts 130. Thus, by manually applying a lifting force to the handle 128, the force of the spring 114 is overcome and the control plates 70 and 72 are caused to carry the upper roller shaft 84 along the guide or slot 90 such as to move the upper roller 74 away from the lower roller 76. A length of twine can then be threaded through the guide 124, between the rollers 74 and 76 and then through a further guide 132 (FIG. 6) located in the panel 58. The handle 128 can then be released and the twine end extending through the guide 132 can be pulled to advance a necessary length of the twine through the rollers 74 and 76.

Figure 6:
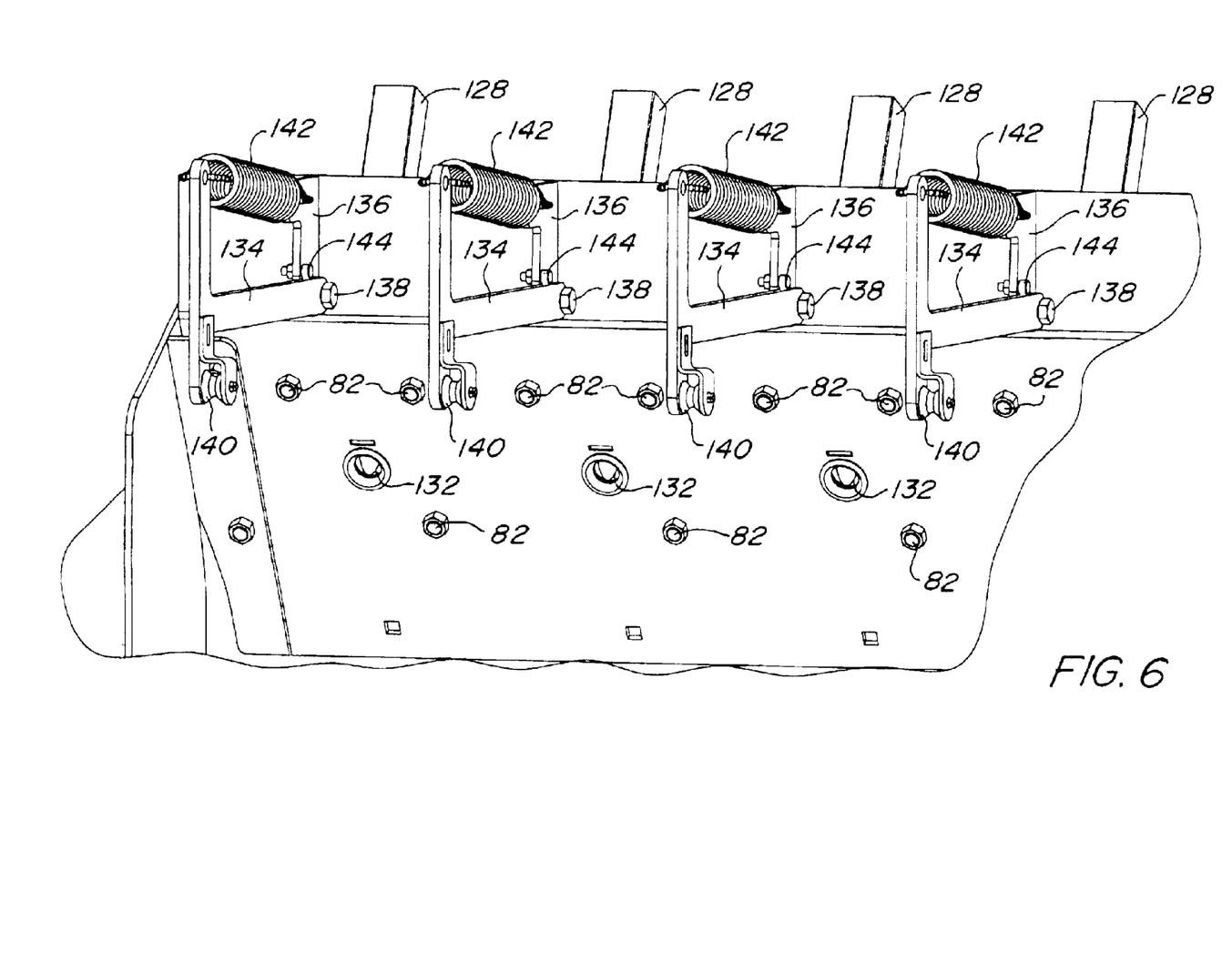
FIG. 6 is a right rear perspective view of the twine tensioner mounting panel and the twine slack take-up arms located there.

Referring now also to FIG. 6, it can be seen that behind the panel 58, and associated one each with one of the tensioners 64, are a plurality of fore-and-aft extending twine slack take-up arms 134. Each arm 134 is generally T-shaped with the stem of the T having its forward end mounted to a bracket 136 for pivoting vertically about a horizontal transverse axis defined by pivot mounts 138. A twine guide roller 140 is mounted to a lower end of the head of the T and is normally engaged by the length of twine emanating from the adjacent twine guide 132. A coil tension spring 142 has hooks formed in its opposite ends that are respectively engaged in a hole provided at the upper end of the head of the T of the arm 134 and in an upper end of the bracket 136. A stop 144 is mounted to the bracket 136 at a location where it engages an upper surface of the stem of the T-shaped arm so as to limit upward pivoting movement of the arm 134. Thus, downward pivotal movement of each arm 134 is resisted by the coil tension spring 142. During the process of tying loops of twine about a bale, the springs 142 cause any excess slack in the loops of twine to be taken up so that a tying malfunction due to such excess slack does not occur.

In operation, assume that a knot, which is tied to join two supply rolls of twine together, is in a length of twine passing through one of the twine tensioners 64 at a location just upstream of the tensioner. Then, if the tying process requires more twine, a pulling force will be exerted on the twine length to cause it to be pulled through the nip of the upper and lower ribbed rollers 74 and 76. When the knot reaches the nip, it will exert a force on the upper roller 74 so as to cause it to be lifted against the bias of the spring 114. Because the roller shaft 84 is constrained by the guide slots 90, the roller will be moved along a path having a corresponding shape, this shape being such that the spring force resisting movement of the roller 74 away from the roller 72 initially increases a small amount during the upward movement of the roller 74, noting that the shaft 84 is close to the top of the vertical legs of the slots 90, and then remains substantially constant as the roller 74 moves substantially horizontally to the rear in the gradually sloped part of the guide slots 90 resulting in the amount of tension force exerted on the twine remaining substantially constant as the knot is advanced through the nip of the rollers 72 and 74. It is also noted that the direction of the gradually sloped part of the guide slot 90 is favorable since a majority of the tension force tending to separate the rollers 73 and 74 is directed parallel to the gradually sloped part of the guide slots 90.

When it is necessary to load the system with a new length of twine, this may easily be done manually by exerting a lifting force on the handle 128 of the respective tensioner 64 with one hand while using the other hand to thread the twine through the twine guide 124, the gap between the rollers 74 and 76 and the twine guide 132. The handle 128 may then be released and the twine end grasped and pulled to advance sufficient twine through the rollers 74 and 76 for permitting the twine to be threaded over the slack arm roller 140 and then on to other components of the tying assembly, as is well known.

Having described the preferred embodiment, it will become apparent that various modifications can be made without departing from the scope of the invention as defined in the accompanying claims.

What is claimed is:

1. In a twine tensioner including first and second, cooperating ribbed rollers, having respective ribs adapted for engaging a length of twine extending between the rollers, and being respectively coupled to first and second shafts, with said first roller being mounted for movement toward and away from said second roller and a spring assembly being coupled to said first roller for exerting a force yieldably resisting movement of said first roller away from a position wherein it is spaced a minimum distance from, and has ribs intermeshed with ribs of, said second roller, the improvement comprising:

a mounting structure being provided with a guide surface engaged by and guiding said second shaft and being in such geometrical relationship to said spring assembly that as said first roller moves away from said second roller said spring force remains substantially constant, whereby a knot in a length of twine extending between said cooperating ribbed rollers may be pulled through said rollers without appreciably increasing a tension force in said length of twine.

2. The twine tensioner, as defined in claim 1, wherein said mounting structure includes:

a pair of fixed mounting plates including spaced parallel portions; and said guide surface being defined by guide slots provided in each of said parallel portions of said pair of fixed mounting plates; and said first shaft having opposite end portions respectively received in said guide slots.

3. The twine tensioner, as defined in claim 2, wherein said first roller is located substantially vertically above said second roller when a minimum distance exists between said first and second shafts; and said guide slots each including a substantially vertical forward end section joined to a gradually upwardly and rearwardly inclined remaining section, as considered in a direction of travel of twine through the tensioner.

4. The twine tensioner, as defined in claim 2, wherein a pair of parallel roller control plates are mounted between said mounting plates and include respective circular holes receiving said opposite end sections of said first shaft;

said control plates each being provided with a clearance opening receiving respective end sections of said second shaft so as to permit said control plates and said first shaft to move relative to said mounting plates; and said spring assembly being connected to said pair of roller control plates.

5. The twine tensioner, as defined in claim 4, wherein said spring assembly includes:

a support shaft mounted to said mounting plates, exclusive of said control plates, at a location at an opposite side of said second shaft from said first shaft;

a T-bolt having a stem extending crosswise through said support shaft and having a head having opposite end sections engaged with receptacles provided in said control plates; and a spring acting between said support shaft and said T-bolt so as to bias said first roller towards said second roller.

6. The twine tensioner, as defined in claim 4, and further including a handle fixed to said control plates for permitting said first roller to be manually shifted away from said second roller for permitting twine to be threaded through said twine tensioner.

7. The twine tensioner, as defined in claim 1, and further including a twine guide located in substantial alignment with a nip defined between said first and second cooperating ribbed rollers.

8. A twine tensioner comprising:

upper and lower ribbed rollers;

upper and lower shafts respectively carrying said upper and lower rollers; a pair of control plates located at opposite ends of said upper and lower rollers and including respective circular bores receiving end sections of said upper shaft, and including respective clearance openings receiving end sections of said lower shaft; a pair of mounting plates respectively located beside said pair of control plates and including respective guide slots receiving said end sections of said upper shaft, and including respective circular bores receiving said end sections of said lower shaft;

a spring assembly coupled between said control plates and said mounting plates for exerting a force resisting movement of said upper roller away from said lower roller; and each guide slot being shaped such that movement of said upper roller away from said lower roller occurs without an appreciable increase in said force exerted by said spring assembly, whereby during operation with a length of twine located between said upper and lower ribbed rollers no appreciable increase in the tension of said length of twine will occur even in the event where a knot in said length of twine passes between said upper and lower rollers.

9. The twine tensioner, as defined in claim 8, wherein said spring assembly includes:

a support shaft mounted only in said mounting plates;

a spring mounting rod reciprocably mounted in said support shaft and having one end attached to said pair of roller control plates; and a coil compression spring received on said spring mounting rod and mounted so as to exert said force between said support shaft and said spring mounting rod.

10. In a twine tensioner including first and second, cooperating ribbed rollers, respectively coupled to first and second shafts, wherein said first roller is mounted for movement toward and away from said second roller and a spring assembly being coupled to said first roller for exerting a force yieldably resisting movement of said first roller away from said second roller, the improvement comprising:

a handle connected to said first roller for permitting said first roller to be manually moved away from said second roller in opposition to said force yieldably resisting movement of said first roller away from said second roller.

* * * * *